(12) United States Patent
Yates

(10) Patent No.: US 7,048,285 B1
(45) Date of Patent: May 23, 2006

(54) REACTIVE AXLE AND SUSPENSION FOR A VEHICLE

(76) Inventor: Derek Harold Yates, 558 Oaklawn Ave., Chula Vista, CA (US) 91910

( * ) Notice: Subject to any disclaimer, the term of this patent is extended or adjusted under 35 U.S.C. 154(b) by 441 days.

(21) Appl. No.: 10/358,538

(22) Filed: Feb. 4, 2003

Related U.S. Application Data

(60) Provisional application No. 60/354,380, filed on Feb. 7, 2002.

(51) Int. Cl.
*B60G 3/14* (2006.01)
(52) U.S. Cl. .......................... 280/124.104; 280/124.153
(58) Field of Classification Search ......... 280/124.104, 280/124.105, 124.153, 104; 180/345, 227
See application file for complete search history.

(56) References Cited

U.S. PATENT DOCUMENTS

| | | | |
|---|---|---|---|
| 3,191,711 A | 6/1965 | Conner | |
| 3,277,975 A | * 10/1966 | Van Winsen | ................ 180/359 |
| 3,484,091 A | 12/1969 | Draves | |
| 3,573,882 A | * 4/1971 | Van Winsen | ......... 280/124.105 |
| 3,601,385 A | 8/1971 | Senter | |
| 4,098,523 A | 7/1978 | Valero | |
| 4,108,267 A | * 8/1978 | Valerio | ....................... 180/345 |
| 4,282,945 A | 8/1981 | Bessay | |
| 4,353,571 A | 10/1982 | Anderson | |
| 4,572,317 A | * 2/1986 | Isono et al. | ................ 180/227 |
| 4,813,702 A | * 3/1989 | Arai et al. | ............ 280/124.104 |
| 4,988,120 A | 1/1991 | Jones | |
| 5,029,893 A | 7/1991 | Walton et al. | |
| 5,098,121 A | 3/1992 | Walton et al. | |
| 5,108,127 A | 4/1992 | Chandler | |
| 5,123,672 A | 6/1992 | Walton et al. | |
| 5,127,887 A | 7/1992 | Nuttall | |
| 5,458,359 A | 10/1995 | Brandt | |
| 5,803,200 A | 9/1998 | Brandt | |
| 5,971,654 A | 10/1999 | Sweeney, Jr. | |
| 6,167,361 A | 12/2000 | Bristow et al. | |
| 6,386,565 B1 | 5/2002 | Kugler | |

OTHER PUBLICATIONS

Summit Racing Catalogue, Jan.-Feb. 2002, pp. 198-200.

* cited by examiner

*Primary Examiner*—David R. Dunn
(74) *Attorney, Agent, or Firm*—Eric B. Alspaugh

(57) ABSTRACT

A rotary force when applied to an axle causes the wheel (10) to turn but the vehicle itself reacts to this rotation with an equal and opposite force and rotates the vehicle in the opposite direction lifting the front of the vehicle when accelerating forward. A reactive arm (13) is fitted to the driving axle in a manner where it can use this reaction to the rotary force and redirect this force to a point on the chassis (18) where this force can be used to counteract the effects of this rotary force and of weight transfer caused by acceleration of the chassis.

16 Claims, 5 Drawing Sheets

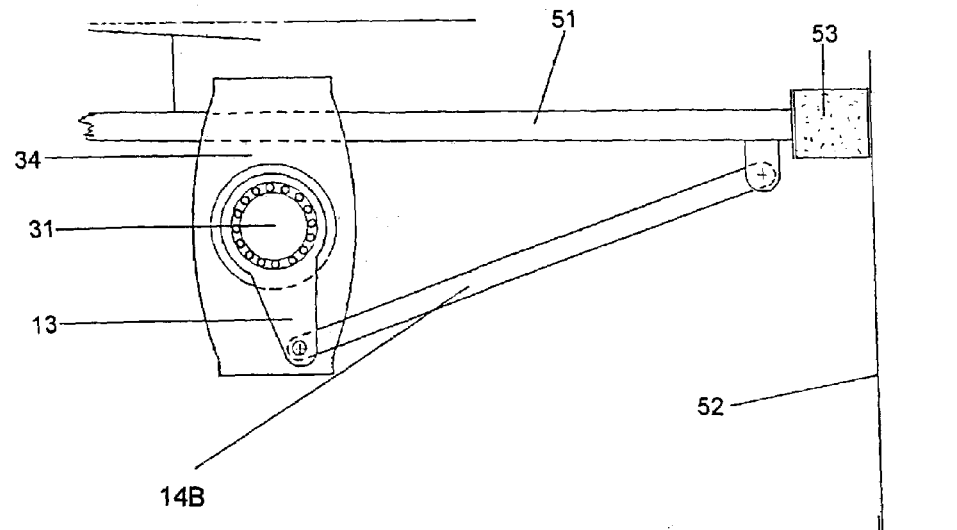
FIG 5
FIG 6
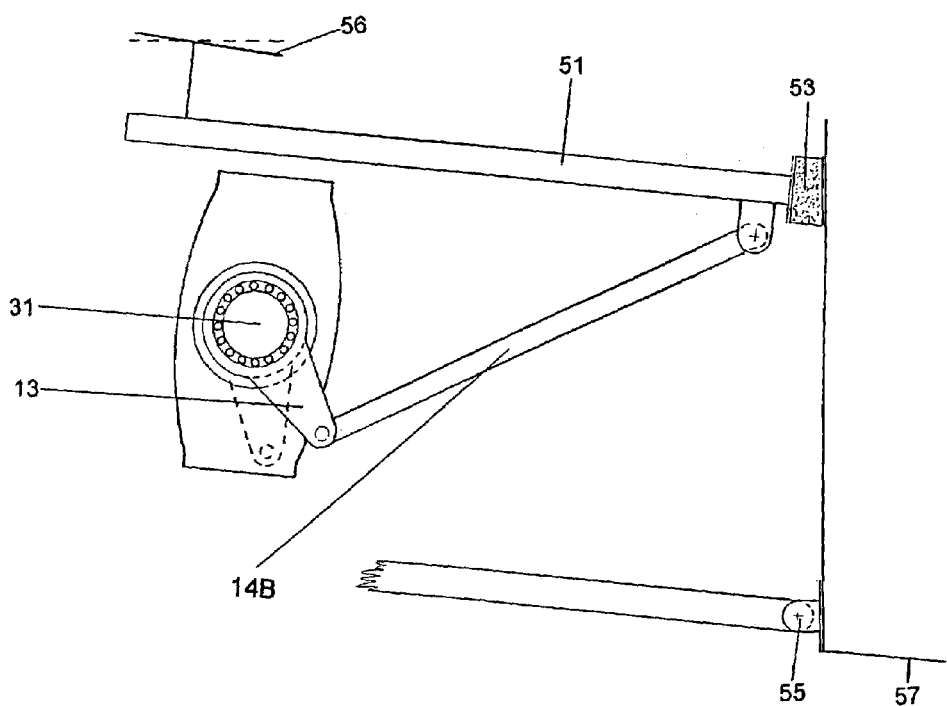

REACTIVE AXLE AND SUSPENSION FOR A VEHICLE

CROSS REFERENCE TO RELATED APPLICATION

This application claims the benefit of Provisional Patent Application Ser. No. 60/354,380 filed Feb. 7, 2002.

FEDERALLY SPONSORED RESEARCH

Not Applicable

SEQUENCE LISTING OR PROGRAM

Not Applicable

BACKGROUND OF THE INVENTION

1. Field of the Invention

This invention relates to the drive axle of a vehicle, specifically to the use of axle torque to enhance the performance and suspension of a vehicle.

2. Background of the Invention

When a vehicle accelerates forward weight is transferred towards the rear of the vehicle. This weight transfer causes additional weight to be placed on the rear of the vehicle compressing the suspension. Similarly weight is transferred off the front suspension lightening the load on the front axle. For many years this was not a problem but as the power output of engines and the traction of tires increased the weight transfer became so great in some high performance vehicles as to cause insufficient weigh to remain on the front axle, and thus the front tires, resulting in a lack of steering control.

Inventors have addressed this problem in many ways, but all with the same aim; to limit the amount of vertical front suspension or wheel travel. U.S. Pat. No. 4,353,571 to Anderson acknowledges this. This invention allows a motorcycle to be ridden with the front wheel not in contact with the road surface but a 'wheele bar' attached behind the rear wheel and used as a stabilizer. It should be noted, however, that there is no steering control for the rider using the above mentioned device.

Another problems associated with the power gains of modern engines is the driving axle causing a twisting or 'winding up' effect on a typical leaf spring type suspension. As early as 1965 solutions were being sought and U.S. Pat. No. 3,191,711 from this date is an early attempt. It should perhaps be noted that this invention uses the principle of my invention, that is, axle torque, but used to lower the rear of the vehicle for improved traction of the rear tires. While effectively solving the problem of axle 'wind up' it was later discovered that raising the car beneficially altered the moment of the center of gravity for improved traction. U.S. Pat. Nos. 4,098,523 and 5,354,092 are other examples of typical solution to the problem of axle 'wind up' but do nothing to address the problem of the lack of steering control mentioned above.

A chassis design proposed by Jones, U.S. Pat. No. 4,988,120 addresses both problems by limiting the amount the front suspension is allowed to travel with the use of 'wheelie bars', mentioned above, U.S. Pat. No. 4,353,571, Anderson. However if the weight transfer of acceleration has sufficient inertia, weight can actually be transferred from the rear wheels to the wheelie bar causing a lack of traction for the rear tires.

Another problem, particularly for motorcycles, is created by improvements to the brakes. This problem is the opposite of the rearward weight transfer described above. During braking weight is transferred forward. If the braking force is powerful enough the rear wheel(s) can lose contact with the road with a resulting loss in braking efficiency and control. The solution provided by my invention uses the reaction to engine torque, or wheel mass inertia on braking, coupled to a simple linkage or other means, to reverse the effects of weight transfer on the vehicle's suspension.

PRIOR ART

U.S. Pat. No. 3,191,711 Conner Jun. 29, 1965
U.S. Pat. No. 3,484,091 Draves Dec. 16, 1969
U.S. Pat. No. 3,601,385 Senter Aug. 24, 1971
U.S. Pat. No. 4,282,945 Bessay Aug. 11, 1978
U.S. Pat. No. 4,098,523 Valero Jul. 4, 1978
U.S. Pat. No. 4,353,571 Anderson Oct. 12, 1982
U.S. Pat. No. 4,988,129 Jones Jan. 29, 1991
U.S. Pat. No. 5,127,079 Nuttall Jul. 7, 1992
U.S. Pat. Nos. 5,029,893, and 5,098,121, and 5,123,672 all by Walton et al, various dates
U.S. Pat. No. 5,108,127 Chandler Apr. 28, 1992
U.S. Pat. No. 5,458,359 Brandt Oct. 17, 1995
U.S. Pat. No. 5,803,200 Brandt Sep. 8, 1998
U.S. Pat. No. 5,971,654 Sweeney Jr., Oct. 26, 1999
U.S. Pat. No. 6,166,361 Bristow, et al Dec. 26, 2000
U.S. Pat. No. 6,386,565 Kugler May 14, 2002
Summit and others racing parts catalogues, circa 1970 to present.

BACKGROUND OF THE INVENTION—OBJECTS AND ADVANTAGES

Accordingly, some of the objects and advantages of my invention are;
(a) to provide a means to control axle torque while allowing all suspension components to function efficiently.
(b) to provide a means where the engine torque helps balance the effects of weight transfer.
(c) to provide a means where suspension geometry will remain true during high torque imput.
(d) to provide a means where tire traction can be improved
(e) to provide a means of adding weight to the front axle to maintain steering control during acceleration.
(f) to provide a means of better braking control.
(g) to provide an alternate suspension system for certain vehicles.

Further advantages of my invention will become apparent from the following drawings and description.

SUMMARY

In accordance with the present invention a vehicle having a means to provide power to a driving axle which contains an arm assembly which reacts with equal and opposite force to this application of power. The arm assembly is connected by a linkage and rocker system or other means to a position on the chassis where this force can act upon the chassis or frame to control suspension movement.

DRAWINGS—FIGURES

FIG. 5 shows the invention in its simplest form used on the rear axle of a dragster.

FIG. 6 shows an example of how reactive suspension may be used on a modern race car where ground effects are used to enhance traction.

In the drawings, closely related figures have the same number but different alphabetical suffixes.

DRAWINGS—REFERENCE NUMERALS

Figure 1:
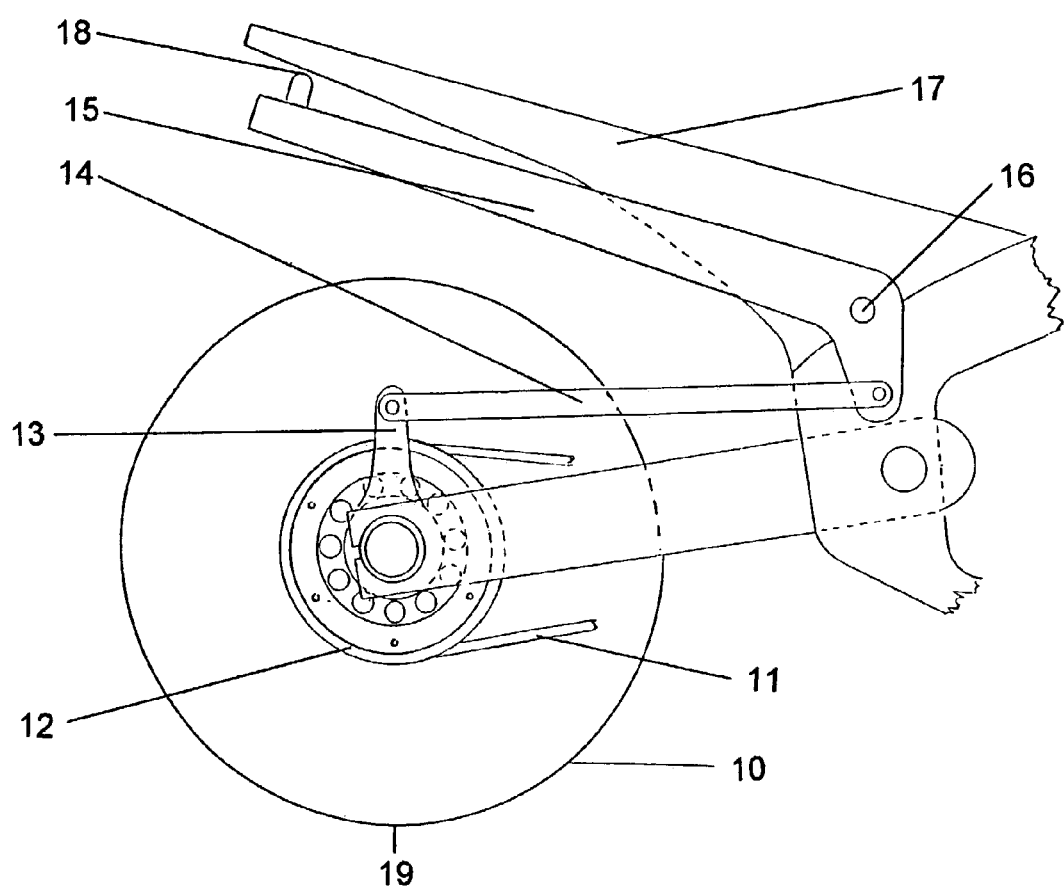
FIG. 1 shows the reactive suspension as used on a motorcycle.

10(A) wheel
11 chain or belt drive
12 sprocket or pulley 32 bearings
13 reaction arm
14(A,B) linkage
15 rocker
16(A) pivot for rocker
17(A) chassis or frame
18(A) rear point on chassis or frame
19 point where wheel touches surface
20 coil spring and shock absorber unit
21 trailing arm
22 sub frame
23 pivot for trailing arm
24 hydraulic rams
32 brake caliper
31 axle
32 bearings
33 bushings
34 hub carrier
35 holes for mounting for suspension
36 brake caliper
41 axle housing
51 upper frame roll
52 tub
53 flexible mount
54 tower frame rail
55 bushing
56 wing
57 floorpan
70 coil

DETAILED DESCRIPTION —FIG. 1. PREFERRED EMBODIMENT

A preferred embodiment of my reactive axle and suspension system is illustrated in FIG. 1 as used on a motorcycle. The engine and front of the motorcycle are not shown. A rotary force is applied to the wheel (10) by a chain or belt (11) resulting in a clockwards rotation of sprocket or pulley (12) causing an equal and opposite reaction to arm (13). A linkage (14) transfers linear motion to a rocker (15) which pivots at a point (16) on the frame (17) causing an upward movement at the rear of the motorcycle (18) behind the back wheel. The point at which the back wheel touches the ground (19) becomes a pivot for this upward movement at point (18) causing the front tire (not shown) of the motorcycle to be pressed onto the road surface for improved steering control.

Figure 2:
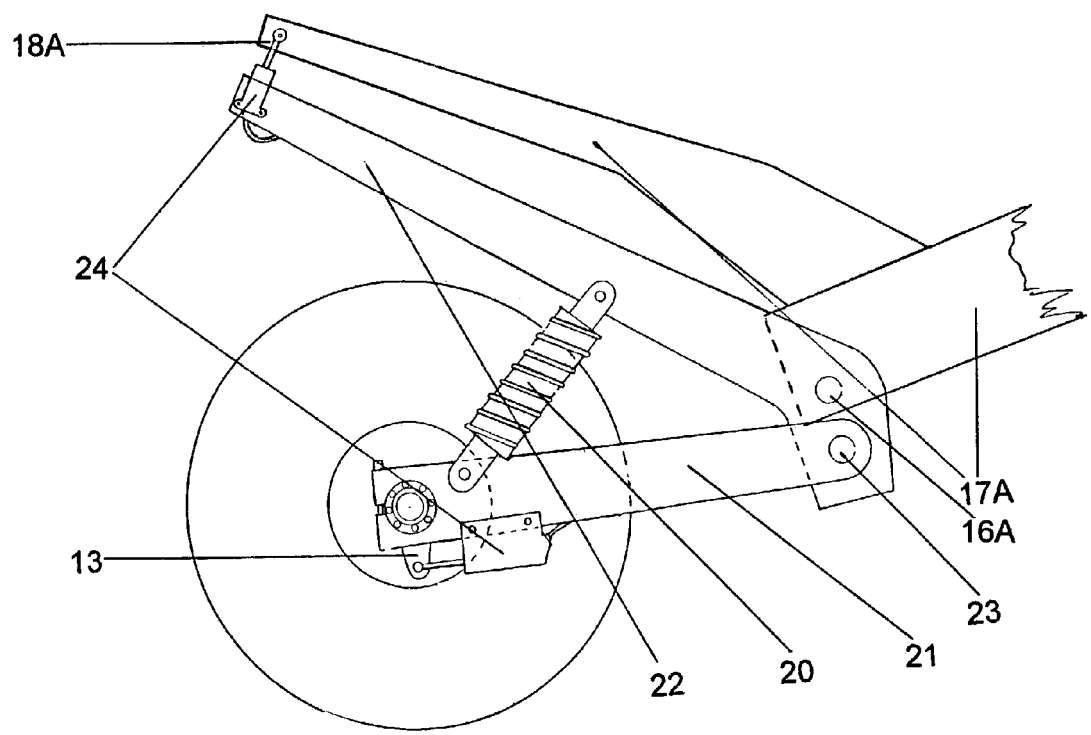
FIG. 2 shows a motorcycle where reactive suspension is used but the motorcycle's conventional suspension is housed in an independent sub frame.

As one of the objects of my reactive axle and suspension is to create an upward thrust at the rear of a vehicle this may compromise the some of the normal functions of the sophisticated suspensions used today. In FIG. 2 a coil spring and shock absorber unit (20) is attached at the lower end to the trailing arm (21) and at the top to a sub-frame (22). The trailing arm, coil over shock absorber, and sub-frame form the units of a conventional suspension assembly. Trailing arm (21) pivots at point (23) for normal suspension movements.

Sub-frame (22) now becomes the rocker (15) of FIG. 1 pivoting at point (16A) in frame (17A) in reaction to axle torque applied to rocker causing an upward movement at the rear of the motorcycle (18A) with the same result as in FIG. 1. The conventional suspension system can thus function as designed within the sub-frame independent of axle reaction.

Another method of operating is shown in FIG. 2 where hydraulic rams (24) replace the linkage described above. In an often confined space the linkages required to operate this system may be intrusive and add to the maintenance. Another advantage as pertaining to motorcycles is it would allow a racer to turn off the reactive system with a hydraulic switch (not shown) for race victory celebration wheelies.

Figure 3:
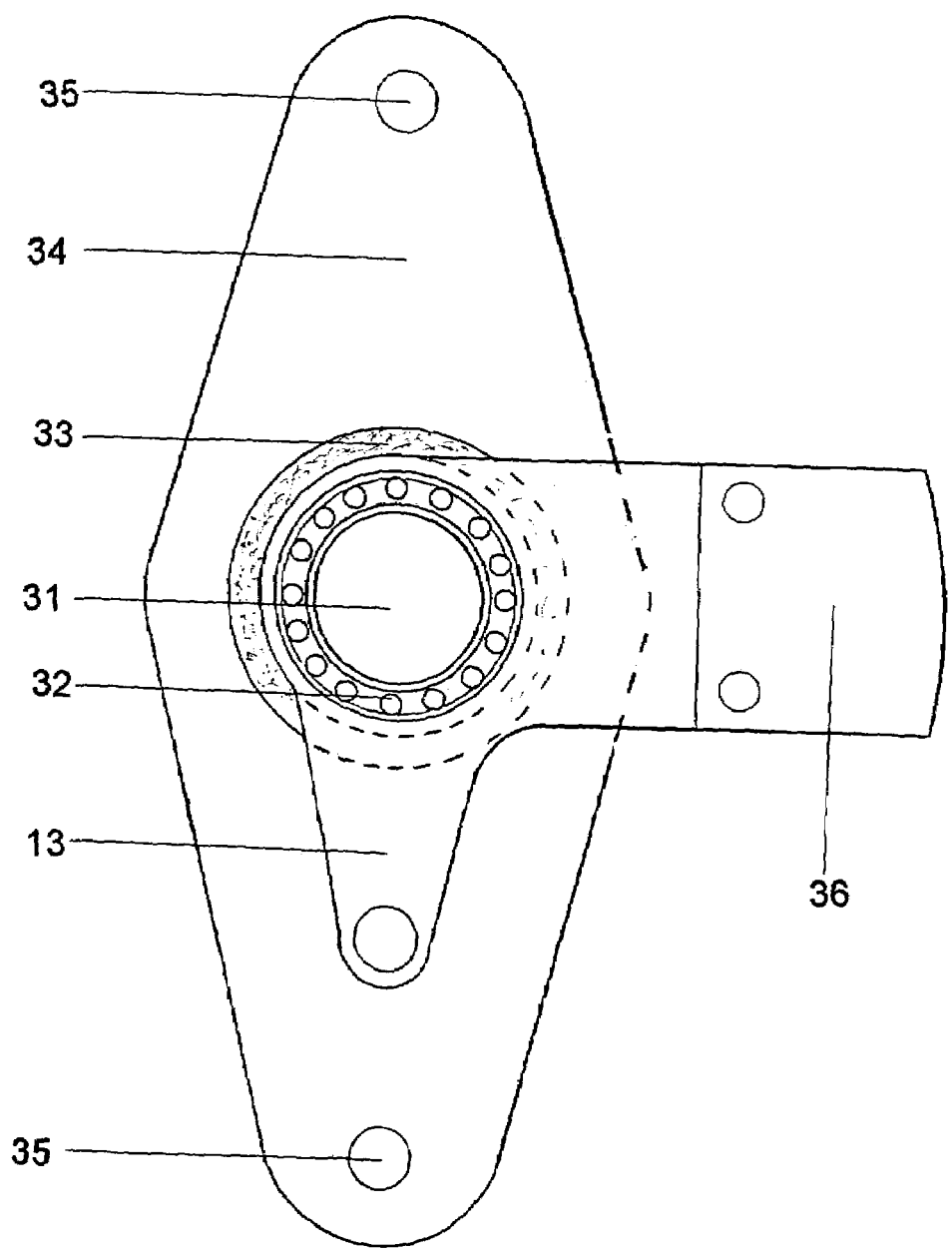
FIG. 3 shows an alternative means to operate the system where hydraulic rams replace the mechanical linkage.

The reactive axle assembly is shown in FIG. 3 where an axle (31) rotates in bearings (32). Reaction arm (13) is free to turn in bushings (33) or encapsulated in a flexible compound to control movement and held within a hub carrier (34).

Newton's third law of motion tells us that for every action there is an equal and opposite reaction thus a clockwards turning of axle (31) causes an equal and opposite reaction and thus turns reaction arm (13) counter clockwards within the hub carrier (34). Mounting holes (35) provide a means to attach hub carrier to the arms of the vehicle's suspension. Also shown in this example is a disc brake caliper (36) fitted to the reaction arm (13). The drive means and wheel mass posses kinetic energy which will act in the opposite fashion to axle torque when the brakes are applied and lower the rear of the vehicle.

Figure 4:
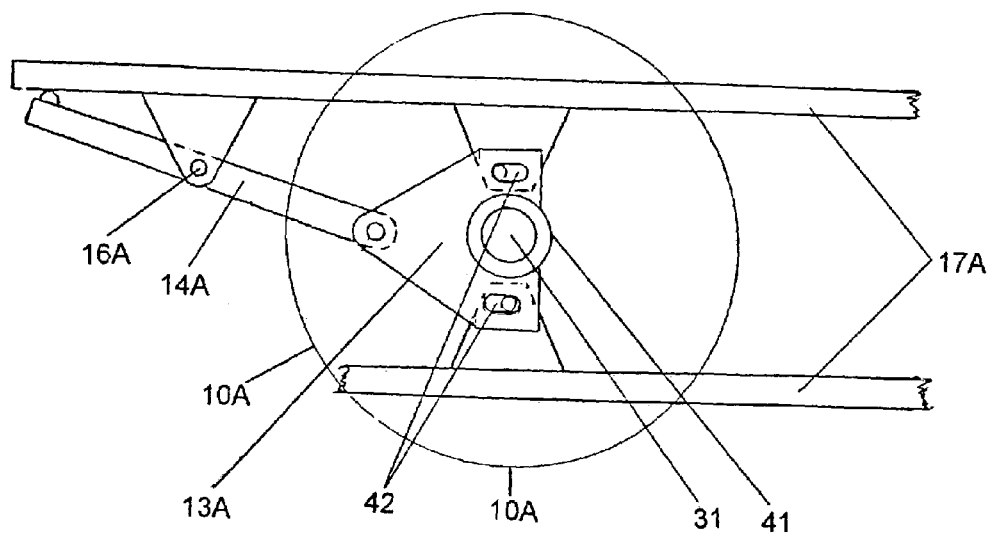
FIG. 4 shows the heart of the reactive system where the reaction arm is housed in a hub carrier and can be bolted to the suspension in a conventional way.

FIG. 4 is an example of the reactive axle in its simplest form, applied to the rear axle of a dragster where the rear axle is attached directly to the frame or chassis. An engine (not shown) provides the means to turn axle (31) in axle housing (41). A reaction arm (13A) is permanently attached to the axle housing (41) with slots (42) or other means to provide a movable method of attaching reaction arm (13A) to chassis (17A). At the rear of the reaction arm (13A) is connected a linkage (14A) which acts as a lever when pivoted at a point (16A). Clockwards rotation of wheel (10A) results in counter clockwards rotation of axle housing (41) and thus a downwards movement of reaction plate (13A) and linkage (14A). Pivot (16A) causes linkage (14A) to move with an upward force at rear of chassis (18B) where linkage contacts chassis (17A) at a point behind the back wheels. The rear wheels (10A) become a pivot for this chassis movement resulting in a downwards movement at all points forward of rear wheels (10A).

FIGS. 5, and 6 show examples of how this system can be used on a modern race car that employs aerodynamics and ground effects as axle (31) rotates in reaction arm (13) which rotates in hub carrier (34). A linkage (14B) connects reaction arm (13) to the upper frame rail (51). Upper frame rail (51) is attached to tub (52) by means of a flexible mounting (53) or similar. Lower frame rail (54) is attached to tub by means of a bushing (55) or other device that will allow rotation of the complete rear chassis assembly about this point.

In FIG. 6 the race car chassis as described in FIG. 5 is shown under a high torque loading. Torque causes a clockwards rotation of the rear axle (31) and, in reaction, a rotation of arm (13). A linkage (14B) transfers linear motion to upper frame rail (51). This force compresses flexible mounting (53) according to torque loading. Thus the complete rear chassis assembly rotates around bushing (55) altering the angle of the rear wing (56) and lowering the floorpan (57) of the car.

The reactive system described in FIGS. 5 and 6 becomes of greater benefit when the torque multiplication of gear ratios are considered: In lower gears (slow speed, tight corners) the force will be greater; a) lowering the car for greater downforce and a lower center of gravity and inclining the rear wing. Both of these effects will have a positive effect on the roadholding capabilities of the car. In higher gears there will be little ratio multiplication of torque, lessening the force applied to flexible mounting (53) returning the car towards its static height where; a) added ground clearance reduces downforce and b) rear wing will a lower angle of attack, reducing drag. Both of these effects will improve the top speed of the car.

It should also be noted that in most forms of competition any aerodynamic devices must be rigidly attached to the chassis even though it is acknowledged that movable parts would operate more efficiently. This is a method where rigidly mounted aerodynamic devices are rigidly mounted to the chassis. The chassis described uses conventional attachment methods but an force is applied to the chassis in a new manner. This force causes the chassis itself to change its shape with speed for maximum efficiency.

Figure 7:
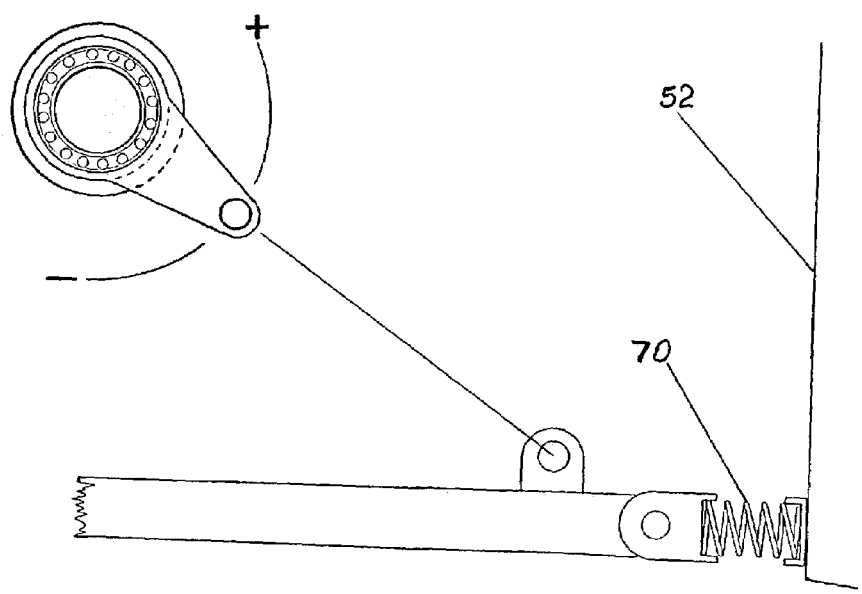
FIG. 7 shows the effect of axle torque on a modern race car equipped with rective suspension.

FIG. 7 illustrates a variation on FIGS. 5, and 6 where a coil spring (70) replaces the flexible mounting (53). The over-center geometry in this illustration causes the spring (70) to expand when positive+(accelerating) or negative–(decelerating) torque or braking inertia is applied. In this manner the car will also be lowered during braking with the benefits described above.

As described above the purpose of this invention is to provide an upward thrust at the rear of the vehicle. Although never tested due to the infinite permutations it is reasonable to assume that engine torque could provide a complete suspension system for certain vehicles. As an added advantage this would eliminate the weight and cost of conventional springs and mounting hardware while benefiting from the safety of better steering control.

CONCLUSION, RAMIFICATION AND SCOPE

The above drawings and descriptions have illustrated the workings of my reactive axle. The reaction axle assembly is so versatile it can be used in almost any vehicle; motorcycles, circuit racing cars, and dragsters have been used as examples here.

A single disadvantage to this system could be found on automobiles with 'live' rear axles as drive line fidelity would be compromised. A way of overcoming this would be to have the axle mis-aligned when the car is not moving and correctly aligned when the vehicle is under power. Different length reaction arms could ensure the axle's alignment stays within the tolerances of the drive shaft coupling.

Some vehicles may be able to use this system where the axle torque lifts or supports the weight of the rear of the vehicle. Top levels of drag racers and speedway motorcycles are examples of this.

A new generation of racers using front wheel drive cars are making new demands on traction. Previously, as described above, the problem was a lack of steering control as weight was transferred to the rear. With front wheel drive the problem also becomes one of lack of traction as weight is removed from the driving tires. One of the objectives of my reactive axle is add weight to the front axle which will take front wheel drive cars to a level of performance previously unattainable.

Although I have not provided examples of my reactive axle the creative minds of racers will find many ways of using the reactive axle to lift the rear of the car adding weight to the front driving axle for better tire traction.

The examples above all refer to the invention as used in competition machines. High performance vehicles are common place on the road. Many of today's performance vehicles use sophisticated electronics to control the suspension. Typically they use shock absorber stiffness to control suspension movements. The purpose of the reactive axle is to create suspension movement. An example of a comparison of the differences would be on heavy braking: Stiffening the shock absorbers electronically on braking would restrict the front of the car 'diving' and the back would stay at an almost even level. With a reactive rear axle the front of the car would still 'dive' but so too would the rear of the car. Thus the car would also remain somewhat level, although lower. Anyone who has seen the television advertisements of vehicles being crash tested against a solid wall may have noticed the rear of the vehicle usually leave the ground. With the rear of the vehicle lowered as in this example the possibility of the rear wheels of the vehicle leaving the ground becomes less due to the lower center of gravity. Furthermore, in this example, if the reactive axle assembly was also fitted to the front of the vehicle it would control the 'diving' of the front under braking. Axle torque is greater at slower speeds through the torque converting mathematics of gear ratios. The problems that this invention looks to overcome occur at lower speeds due to this torque multiplication. It seems fitting to harness this torque to solve the problem.

I claim:

1. A vehicle body control system for use in a motor vehicle comprising:
    an axle capable of interacting with a reaction arm, both the axle and the reaction arm contained within a hub carrier capable of attaching to a suspension;
    a linkage arm capable of attaching to a rocker at the rockers proximal end, and the rocker further attached to a vehicle frame at the rockers distal end, forming a single pivot point;
    wherein the reaction arm reacts to torque created during acceleration from the axle and applies a force counterwise to the direction of axle rotation through the linkage arm, the linkage arm lifts the vehicle frame through the rocker; conversely, torque created during deceleration from the axle applies a force in the same direction of axle rotation through the linkage arm, the linkage arm lowers the vehicle frame through the rocker.

2. The vehicle body control system of claim 1, wherein a bearing facilitates the free rotation of the axle.

3. The vehicle control system of claim 1, wherein a bushing regulates rotation of the reactive arm.

4. The vehicle control system of claim 1, wherein the axle is capable of turning a single wheel.

5. The vehicle control system of claim 1, wherein the axle is capable of mounting multiple wheels.

6. The vehicle control system of claim 2, wherein a bushing regulates rotation of the reactive arm.

7. The vehicle control system of claim 2, wherein the axle is capable of mounting a single wheel.

8. The vehicle control system of claim 2, wherein the axle is capable of mounting multiple wheels.

9. The vehicle control system of claim 3, wherein the axle is capable of mounting a single wheel.

10. The vehicle control system of claim 3, wherein the axle is capable of mounting multiple wheels.

11. The vehicle control system point of claim 6, wherein the axle is capable of mounting a single wheel.

12. The vehicle control system of claim 6, wherein the axle is capable of mounting multiple wheels.

13. The vehicle control system of claim 7, wherein a bushing regulates rotation of the reactive arm.

14. The vehicle control system of claim 8, wherein a bushing regulates rotation of the reactive arm.

15. The vehicle control system of claim 9, wherein a bearing facilitates the free rotation of the axle.

16. The vehicle control system of claim 10, wherein a bearing facilitates the free rotation of the axle.

* * * * *